United States Patent [19]

Sakamoto et al.

[11] Patent Number: 5,006,392
[45] Date of Patent: Apr. 9, 1991

[54] CERAMIC MOLDED BODY

[75] Inventors: Yukio Sakamoto; Hanato Yoshio, both of Nagaokakyo, Japan

[73] Assignee: Murata Manufacturing Co., Ltd., Kyoto, Japan

[21] Appl. No.: 407,706

[22] Filed: Sep. 14, 1989

Related U.S. Application Data

[63] Continuation-in-part of Ser. No. 303,744, Jan. 25, 1989, abandoned.

[51] Int. Cl.⁵ ............................................. B32B 3/02
[52] U.S. Cl. .................................. 428/137; 428/426; 428/457; 428/461
[58] Field of Search ............... 428/426, 457, 461, 137; 264/60; 252/62.54

[56] References Cited

U.S. PATENT DOCUMENTS 4,626,371 12/1986 Ikenaga et al. .................. 252/62.54
4,798,694 1/1989 Sugata et al. ......................... 264/60

FOREIGN PATENT DOCUMENTS 832365 1/1970 Canada .
0357940 1/1990 European Pat. Off. .

Primary Examiner—Patrick J. Ryan
Attorney, Agent, or Firm—Wenderoth, Lind & Ponack

[57] ABSTRACT

A ceramic molded body which can meet strict dimensional tolerances. A ceramic body is sintered, and during this sintering contracts or shrinks to a point that the ceramic sintered body has dimensions smaller (or larger in the case of through-holes) than the final desired dimensions. The ceramaic sintered body is placed in a mold and a resin coating is applied to the exterior of the ceramic sintered body. The dimensions of the resin coating closely match the final desired dimensions.

3 Claims, 2 Drawing Sheets

CERAMIC MOLDED BODY

This application is a continuation-in-part of now abandoned application Ser. No. 07/303,744 filed on Jan. 25, 1989.

FIELD OF THE INVENTION

The present invention relates to a ceramic molded body, in particular to a ceramic molded body suitable for use in an electrical connector. Such a ceramic molded body is provided with a plurality of through-holes through which mounting pins of the connector may extend.

DESCRIPTION OF THE RELATED ART

A conventional prior art ceramic body is shown in FIG. 3 and referenced by the numeral 11. The ceramic body 11 is formed of a ceramic sintered body 13 comprising a plate-like ferrite provided with a plurality of through-holes 12. The ceramic body 11 will be mounted within a shell of an electrical connector with the pin terminals of the connector extending through the holes 12. Forming the ceramic body 11 of ferrite advantageously reduces the noise of the electrical connector.

Problems have been encountered with this type of prior art ceramic body due to the shrinkage associated with sintering. While the molded size of the body prior to sintering has been apportioned such that the proper final size will be obtained after the contraction or shrinkage due to sintering, fluctuation in various conditions, such as molding pressure or sintering temperature, have been found to affect the final size of the ceramic body. The high dimensional accuracy required of these ceramic bodies for use in electrical connectors do not allow such variation in the final size of the ceramic body. This inevitably leads to increased production costs due to efforts to minimize fluctuation in production parameters and/or in increased scrap losses.

SUMMARY OF THE INVENTION

It is an object of the present invention to provide a ceramic molded body having a high dimensional accuracy.

It is another object of the present invention to provide a ceramic molded body having a high dimensional accuracy and a simple construction.

A further object of the present invention is provide a ceramic molded body having high noise suppression.

The above objects are met by a ceramic molded body which can meet strict dimensional tolerances. A ceramic body is sintered, and during this sintering contracts or shrinks to a point that the ceramic sintered body has dimensions smaller (or larger in the case of through-holes) than the final desired dimensions. The ceramic sintered body is placed in a mold and a resin coating is applied to the exterior of the ceramic sintered body. The dimensions of the resin coating closely match the final desired dimensions.

BRIEF DESCRIPTION OF THE DRAWINGS

The objects and features of the present invention will be more readily understood from the following description with reference to the accompanying drawings, wherein.

DETAILED DESCRIPTION OF THE INVENTION

Figure 1:
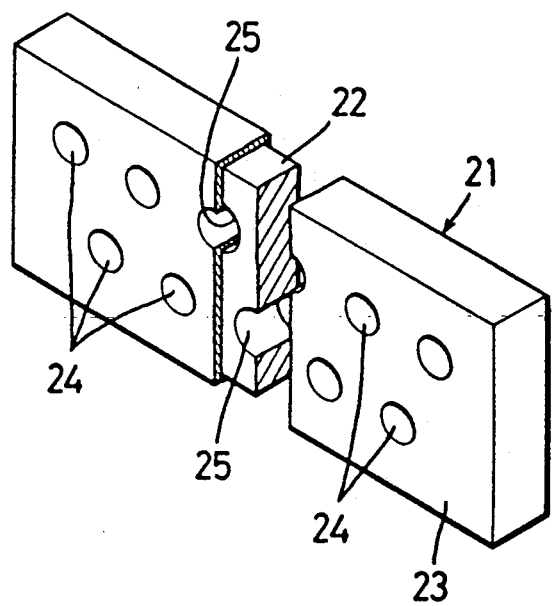
FIG. 1. is a perspective view with partial cut-away of the ceramic molded body of the present invention.
Figure 2:
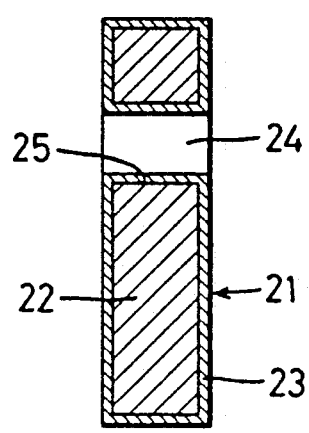
FIG. 2. is a cross-section of the ceramic molded body of the present invention.
Figure 3:
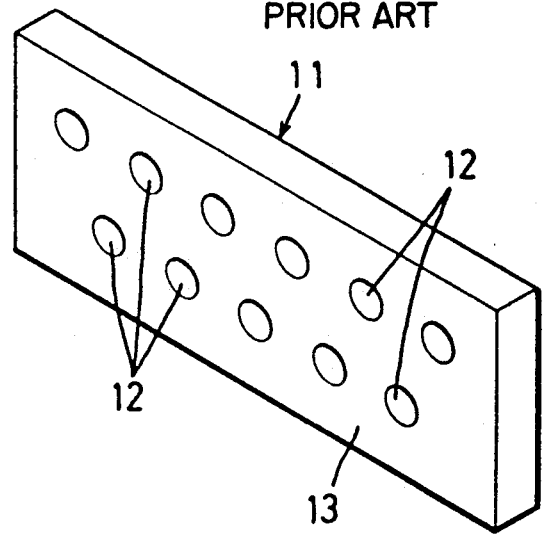
FIG. 3. is a perspective view of a conventional prior art ceramic body.

A ceramic molded body 21 according to the present invention is shown in FIG. 1. The ceramic molded body 21 includes an inner ceramic sintered body 22 having a plurality of through-holes 25 and an outer resin coating 23 covering the exterior of the ceramic sintered body 22 and extending through the through-holes 25 to form through-holes 24.

In general, the ceramic sintered body 22 has a presintering size such that upon sintering the body 22 will shrink or contract to a point where the outer periphery is smaller than the desired final size and the diameter of each of the through-holes 25 is larger than the desired final size. Subsequent to sintering, the ceramic sintered body 22 is coated with the resin 23 to a thickness such that the final dimensions of the combined ceramic sintered body 22 and resin 23 corresponds t the desired final size. Because the resin coating 23 contracts or shrinks much less than the ceramic body 22 contracts or shrinks during sintering, it is much easier to obtain the desired final dimensions within acceptable boundaries. The specific details of the ceramic molded body 21 are discussed below.

The ceramic sintered body 22 is preferably formed of ferrite to achieve the proper noise suppression characteristics. A preferred composition for the ceramic sintered body is $Fe_2O_3$ (47.0–50.0 mol %), NiO (12.0–40.0 mol %), ZnO (2.0–33.0 mol %), CuO (0–8.0 mol %). These components are mixed in a ball mill or a vibration mill and are then prefired in oxygen or air at 800°–1000° C. for at least 30 minutes. These prefired materials are mixed with water and 2–5 wt % (with respect to prefiring materials) of a binder such as polyvinyl alcohol in a ball mill to form a slurry. This slurry is dewatered and dried, and then granulated through meshes or by use of a spray dryer. A mold is then used to form the granulated materials into a form substantially similar to that of ceramic sintered body 22 in FIG. 1.

The molded body formed above is then sintered to form the ceramic sintered body 22. Typical sintering processes include the use of an air or oxygen atmosphere with a heating rate of 100°–200° C. per hour up to a maximum of 1000°–1100° C. The maximum temperature is maintained for approximately two hours at which point cooling at a rate of 100°–200° C. per hour takes place. The ceramic sintered body is thus formed. As would be expected, the ceramic sintered body 22 is dimensionally smaller than the molded body prior to sintering. Specifically, the composition noted above has a coefficient of contraction of approximately 15–17% during sintering. It is important to note, however, that both the size of the molded body prior to sintering and the sintered body are smaller than their conventional prior art counterparts used for the same purpose. In particular, the exterior dimensions of the ceramic sintered body 22 are smaller than the final desired dimensions, and the diameters of the through-holes 25 in the ceramic sintered body 22 are larger than the final diameters desired. In order to achieve these final desired dimensions, a resin coating is applied to the ceramic sintered body 22.

To apply the resin coating 23 to the ceramic sintered body 22, the body 22 is placed within a metal mold which appropriately corresponds to the desired final dimensions of the ceramic molded body 21. The resin is injection molded about the outer surfaces of the ceramic sintered body 22 including the inner surfaces of the through-holes 25. While numerous types of resin, especially those types commonly used with electrical devices, could be used, a preferred resin is polybutylene terephthalate (PBT). The PBT preferably includes approximately 15–30% of glass fibers, with the fibers having a diameter of slightly greater than 10 $\mu$m, and a length of approximately 500 $\mu$m. Such a resin mix has a coefficient of contraction of approximately 0.3 to 1.4%. The resin is coated to a thickness of approximately 0.5 mm during the injection molding.

While it is readily apparent that dimensional tolerances are greatly improved by the use in the present invention of a resin coating having a reduced coefficient of contraction, additional points in this regard should be made. Although the resin layer 23 has been consistently referred to as a "coating" and a typical thickness has been set forth, the critical function of the resin 23 is to provide the proper external dimensions for the ceramic molded body. Thus, the dimensions of the mold used to apply the resin coating 23 are more critical than the exterior dimensions of the ceramic sintered body 22. This allows the production parameters to form the ceramic sintered body 22 to be relaxed to an extent much greater than in the prior art. The dimensional fluctuations common to the ceramic body 22 and the prior art body 11 are absorbed by the resin coating 23 of the present invention.

Figure 4:
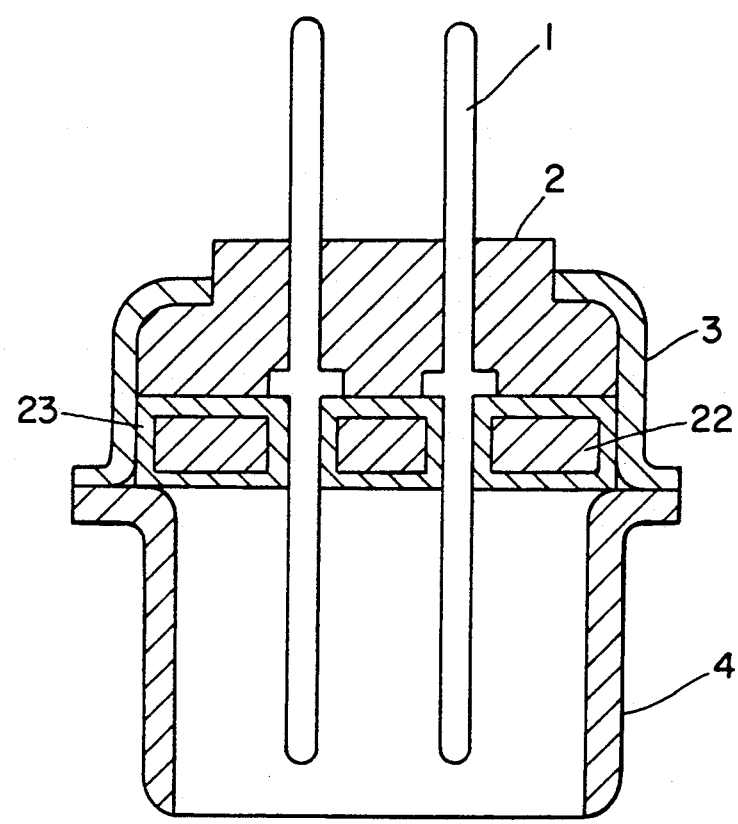
FIG. 4. is a partial cross-section of the ceramic molded body of the present invention housed within an electrical connector.

A typical application for the ceramic molded body of the present invention is shown in FIG. 4. In this figure, the ceramic molded body is used within an electrical connector. The electrical connector consists of a set of pins 1 held within a rear insert of insulating material 2 and within the through-holes of the ceramic molded body. A rear metal shell 3 and a front metal shell 4 complete the construction of the connector. In such an application, the ceramic molded body of the present invention formed of ferrite provides superior noise suppression characteristics. In such an application the noise suppression characteristics of the ceramic molded body may be further improved by the addition of ferrite to the resin coating 23. In such a situation, 80–90% of the resin coating may be comprised of the same constituents used to form the ceramic sintered body 22.

While specific examples have been set forth above, these are not to be taken as limiting and various modifications are easily envisioned. For example, while the resin 23 has been described as covering the entire exterior of the ceramic sintered body 22, the resin 23 may cover only a portion or portions of the ceramic sintered body 22. Additionally, while the resin 23 has been described above as having a coefficient of contraction smaller than that of the ceramic sintered body 22, the reduced volume of the resin coating could allow the use of materials having a coefficient of contraction equal to or greater than that of the ceramic sintered body 22, depending upon the particular dimensional tolerances required. Finally, while the ceramic molded body has been described in terms of an insert for an electrical connector, numerous other uses for the ceramic molded body of the present invention are readily envisioned.

What is claimed is:

1. A ceramic molded body, comprising:
  a ceramic sintered body, said ceramic sintered body having a plurality of outer surfaces and a plurality of through-holes extending through said ceramic sintered body; and
  a resin coating covering the inner circumferential surface of said through-holes of said ceramic sintered body.

2. A ceramic molded body as in claim 1, wherein said resin coating further covers at least one of said outer surfaces of said ceramic sintered body.

3. A ceramic molded body as in claim 1, wherein said ceramic sintered body is formed of a ferrite material and said resin coating includes a ferrite powder.

* * * * *